(12) United States Patent
Brett et al.

(10) Patent No.: US 11,895,089 B2
(45) Date of Patent: *Feb. 6, 2024

(54) SYSTEMS CONFIGURED TO ENABLE ISOLATED CLIENT DEVICE INTERACTION WITH BUILDING AUTOMATION AND CONTROL (BAC) NETWORKS, INCLUDING THIRD-PARTY APPLICATION ACCESS FRAMEWORK

(71) Applicant: WILLOW IP PTY LTD, Sydney (AU)

(72) Inventors: Dale Brett, Sydney (AU); Rani Adam, Sydney (AU)

(73) Assignee: WILLOW IP PTY LTD, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,738

(22) Filed: Mar. 18, 2022

(65) Prior Publication Data

US 2022/0210129 A1    Jun. 30, 2022

Related U.S. Application Data

(63) Continuation of application No. 16/563,298, filed on Sep. 6, 2019, now Pat. No. 11,283,769.

(30) Foreign Application Priority Data

May 5, 2019    (AU) ................. 2019901530

(51) Int. Cl.
*H04L 9/40*    (2022.01)
*G06F 16/25*    (2019.01)

(52) U.S. Cl.
CPC ........ *H04L 63/0263* (2013.01); *G06F 16/252* (2019.01); *H04L 63/0209* (2013.01); *H04L 63/083* (2013.01)

(58) Field of Classification Search
CPC ............. H04L 63/0263; H04L 63/0209; H04L 63/083; G06F 16/252
See application file for complete search history.

(56) References Cited

U.S. PATENT DOCUMENTS 9,473,321 B1 * 10/2016 Bazar .................... G16H 40/63
2014/0269660 A1    9/2014 Dunn et al.
(Continued)

FOREIGN PATENT DOCUMENTS

AU    2019226264 A1 *    11/2020    ........... G06F 16/252
CA    2979202 C    8/2019

OTHER PUBLICATIONS

A. Nugur, M. Pipattanasomporn, M. Kuzlu and S. Rahman, "Design and Development of an IoT Gateway for Smart Building Applications," in IEEE Internet of Things Journal, doi: 10.1109/JIOT.2018.2885652. (Year: 2018).*

(Continued)

*Primary Examiner* — Chau Le
(74) *Attorney, Agent, or Firm* — Cozen O'Connor (57) ABSTRACT

Various embodiments employ technology solutions to enable isolated client device interaction with building automation and control (BAC) networks, for example including configuration of a third-party application access framework which enables access to physical devices in a built environment. For example, a data exchange gateway interfaces a system with a BAC (Building Automation and Control) network, wherein the BAC network provides via the gateway, on a periodic basis, data values presented by each of a plurality of physical devices on the BAC network. A data exchange module receives periodic data values and causes recording of those values in a BAC database isolated from the BAC network. A permissions rules module control access to data in the BAC database. An API request handling (Continued)

module handles requests from third-party software platforms via an API.

10 Claims, 6 Drawing Sheets

(56) References Cited

U.S. PATENT DOCUMENTS

| | | | | |
|---|---|---|---|---|
| 2015/0331396 A1* | 11/2015 | Sami | ................. | G05B 15/02 |
| | | | | 700/275 |
| 2016/0018805 A1* | 1/2016 | Kuoppala | ............... | B66B 1/466 |
| | | | | 700/275 |
| 2018/0119972 A1* | 5/2018 | Trikha | ................ | G05B 19/042 |
| 2019/0363933 A1* | 11/2019 | Morley | ................ | H04W 24/02 |

OTHER PUBLICATIONS

Cisco, "Building Automation System over IP (BAS/IP) Design and Implementation Guide", Retrieved From https://www.cisco.com/c/dam/en_us/solutions/industries/docs/trec/jControls_DIG.pdf, Published Aug. 15, 2008. (Year: 2008).

* cited by examiner

SYSTEMS CONFIGURED TO ENABLE ISOLATED CLIENT DEVICE INTERACTION WITH BUILDING AUTOMATION AND CONTROL (BAC) NETWORKS, INCLUDING THIRD-PARTY APPLICATION ACCESS FRAMEWORK

FIELD OF THE INVENTION

The present invention relates, in various embodiments, to technology configured to enable isolated client device interaction with building automation and control (BAC) networks, for example including configuration of a third-party application access framework which enables access to physical devices in a built environment. While some embodiments will be described herein with particular reference to those applications, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Building access and control networks (for example BACnet networks) are widely used and of central importance to modern buildings. Such systems allow other devices on the networks, for example building management system terminals, to access data and/or control a plurality of connected building assets that connect to the network (for example HVAC and the like). These networks are typically regarded as critical building infrastructure, and must therefore be subjected to high degrees of security and robustness, which leads to challenges in terms of providing flexible access to the building data.

SUMMARY OF THE INVENTION

It is an object of the present invention to overcome or ameliorate at least one of the disadvantages of the prior art, or to provide a useful alternative.

Example embodiments are described below in the section entitled "claims".

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

The description below refers to "systems" and "modules". The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out". The statement becomes meaningless if the determination as to whether something is A is not performed.

The term "system" refers to an arrangement where multiple computers, hardware configurations, and devices are interconnected via a communication network (including a one-to-one communication connection). The term "system", and the term "device", also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

BRIEF DESCRIPTION OF THE DRAWINGS

Embodiments of the invention will now be described, by way of example only, with reference to the accompanying drawings in which.

DETAILED DESCRIPTION

The present invention relates, in various embodiments, to technology configured to enable isolated client device interaction with building automation and control (BAC) networks. While some embodiments will be described herein with particular reference to those applications, it will be appreciated that the invention is not limited to such a field of use, and is applicable in broader contexts.

In overview, the technology disclosed herein comes from an appreciation of value that can be realised by opening up building automation technology access to a wider range of users and third party software applications, for example in the context of enabling trusted third parties to develop their own apps with which users can interact with a building's connected devices. However, there are two major technological hurdles which inhibit such an approach:

Firstly, there is a security problem. Conventional BAC networks, for example networks operating on a BACnet standard, by their very design do not enable customisation over permissions (for example via a security layer). In this manner, opening up the BAC network to user devices (including via third-party apps) gives rise to serious security risks in the sense that users might gain access to a range of critical building systems (accidentally or maliciously). Conventionally, this security risk is addressed via using a secure single software platform to access the BAC network, usually a Building Management System (BMS) having robust security, and often an ability to assign scope-of-responsibility (SOR) permissions to users of the BMS.

Secondly, there is a network traffic problem. As more users gain access to a BAC network, additional traffic runs through the network, giving rise to potential delays, failures and the like. A BAC network is critical infrastructure, and such risks are generally not deemed acceptable for the sake of providing an enhanced experience to general users of a building (for example tenants or the like).

Technology described below overcomes these technical hurdles by providing a system that enables isolated client device interaction with a BAC network. In overview, this includes maintaining a data warehouse of BAC data externally and isolated of a BAC network, and providing a BAC access management system that allows API-based access to that data. In some embodiments the system additionally allows, via the same API, data to be pushed downstream to the BAC network, thereby to effect device control. In both cases, the BAC access management system implements a permissions-based access control protocol which selectively allows/prevents user access to data in the BAC data warehouse (and control functionalities). Permissions rules may be defined based on any attributes defined in the data warehouse, for example location, device type, data type, and so on. This provides for a flexible framework by which app developer are able to create third-party apps for users which allows those users to have an enhanced experience in any building having a BAC network, but without security and network traffic problems outlined above.

Figure 1:
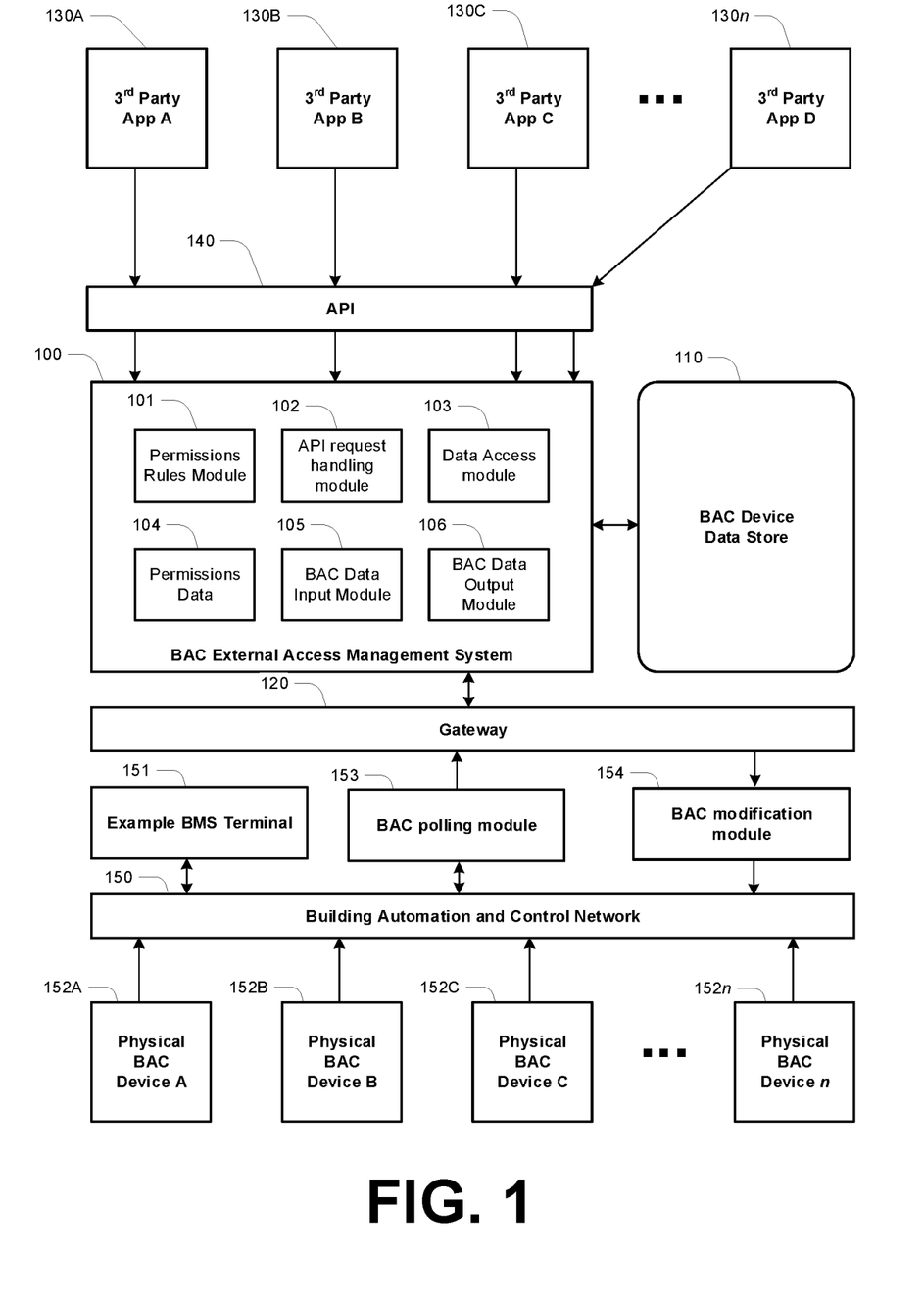
FIG. 1 illustrates a system according to one embodiment.

FIG. 1 illustrates a technology framework according to one embodiment, including a system 100 configured to provide isolated access to a building automation and control network 150. System 100 may connect to network 150 via physical local network infrastructure, with system 100 being defined by one or more local server, or in an alternate embodiments system 100 is a cloud hosted server (for example a virtual device), which communicates with local building infrastructure via a VPN arrangement.

In this example, BAC network 150 is illustrated in a generic form thereby to represent a range of possible BAC networks, for example networks operating on a BACnet standard, irrespective of complex network topology that may be in place. It is approached that there would be additional network infrastructure, for example BACnet controllers and the like, present on network 150. Irrespective of the network topology, BAC network 150 provides network connection to a plurality of physical BAC devices 152A-152n. These connect to the network based on a given BAC protocol, for example BACnet. BAC network 150 is also illustrated to include a conventional building management system (BMS) 151, which is able to operate as a primary component for building and automation functionalities. There may also be other components on the BAC network which access BAC network devices.

A data exchange gateway 120 interfaces system 100 with BAC network 150. For example, this provides a secure firewall to isolate BAC network 150 from external systems. The BAC network provides, via the gateway, on a periodic basis, data values presented by each of a plurality of physical devices on the BAC network (individual components that transmit data values are also referred to as "points"). In the illustrated embodiment a BAC polling module 153, which is defined by computer executable code executing on a computer system coupled to network 150, is configured to poll all or a subset of devices 152A-152n. For example:

In some embodiments polling module 153 is configured to send a broadcast message on the BAC network, thereby to cause all devices to respond with current data values. The responses are retransmitted by module 153 via gateway 120 to system 100.

In some embodiments polling module 153 is configured to send a polling message to a set of specific devices on the BAC network, thereby to cause those specific devices to respond with current data values. The responses are retransmitted by module 153 via gateway 120 to system 100.

In some embodiments the polling for all devices occurs on a set schedule, for example, preferably between once per minute and once every 10 minutes (for example once every five minutes). It will be appreciated that this is, compared to other BAC network polling protocols, a relative long period. This is suitable for requirements of various embodiments, on the basis that user devices should not require real-time data (as they are not performing critical functions, as would BMS terminal 151), and thus approach minimises network traffic in the BMS relevant to system 100.

In some embodiments polling schedules are defined on a device-specific basis, with a first subset of device types being polled on a first schedule, and a second subset on a second scheduled that polls less frequently than the first schedule.

Figure 2:
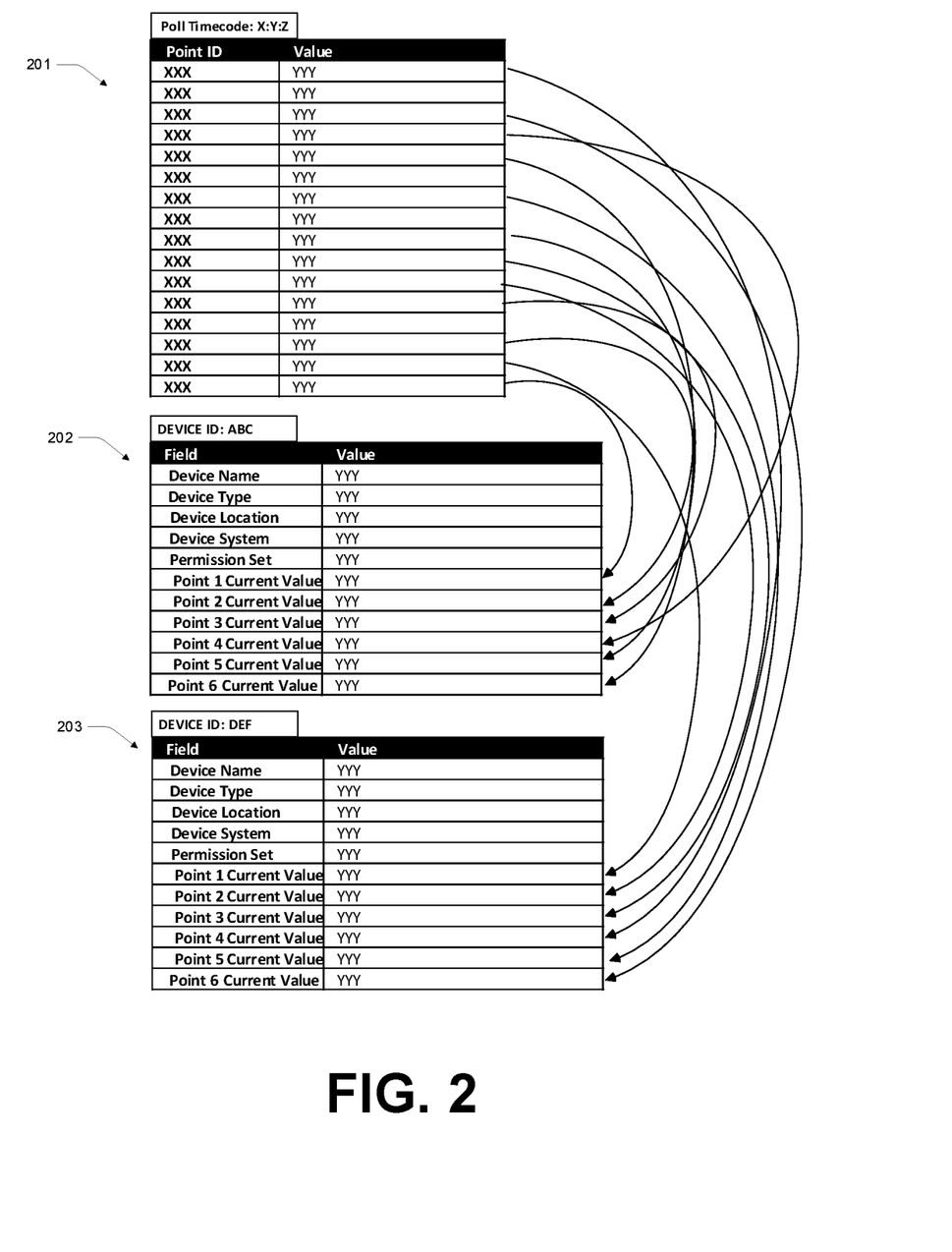
FIG. 2 provides an example of data mapping according to one embodiment.

Data transmitted from BAC network 150 to system 100 is received via a BAC data input module 105, and cause recording of those values in a BAC database 110 isolated from the BAC network 150. Module 105 is configured to receive data, and map that data to appropriate fields in a BAC device data store 110. An example of mapping is illustrated in FIG. 2 which shows an example partial data set 201 received from polling by module 153. Partial data set includes a plurality of Point IDs and data values for a known polling time. Input module 105 uses the Point IDs to map the data values to specific locations in data store 110. In this example, data store 110 maintains a table (or set of otherwise associated data) for each of a plurality of "devices", wherein each device is associated with data values for device attributes (for example name, location, system, type, permission set, and so on) and fields for one or more BAC device point data values (in some embodiments a device defined in data store 110 has only a single point value). In the illustrated embodiment tables 202 and 203 are shown. Each of these tables includes six fields for current point values—these fields are updated based on the mapping protocol implemented by module 105. In some embodiments data store 110 maintains historical data values for each point—for example when a new set of polling data is received those are mapped to the database as values associated with their relevant devices and points, along with timecodes defining the polling time. This allows for analysis of data trends for one or more of the points.

In some embodiments one or more processes are executed on the BAC network side of gateway 120 thereby to add additional context to data obtained via polling prior to transmission of that data to system 150.

A permissions rules module 104 is configured to associate devices for which data is stored in the BAC database with permission rules thereby to control access to data in the BAC database. In the illustrated embodiment module 104 operates in conjunction with the set of permissions data 104, thereby to allow implementation of a set of permission rules which govern access to data in data store 110.

In some embodiments permissions are set at a device level. For example, in respect of a given device, a defined permission set is required to access data stored in data store 110 for that device.

In some embodiments permissions are set at a device attribute level. For example, in respect of a given device having a given attribute value (for example device location=second floor), a defined permission set is required to access data stored in data store 110 for devices having that attribute. It will be appreciated that combinations of attributes may also be used (for example a combination device system and device type).

An API request handling module 102 is configured to receive, via an API, requests from a plurality of third-party software platforms. Platforms 130A are 130*n* are shown. A more detailed example of device communication is shown in FIG. 3, which shows an example for a given one of $3^{rd}$ party apps 130A-130*n*.

Figure 3:
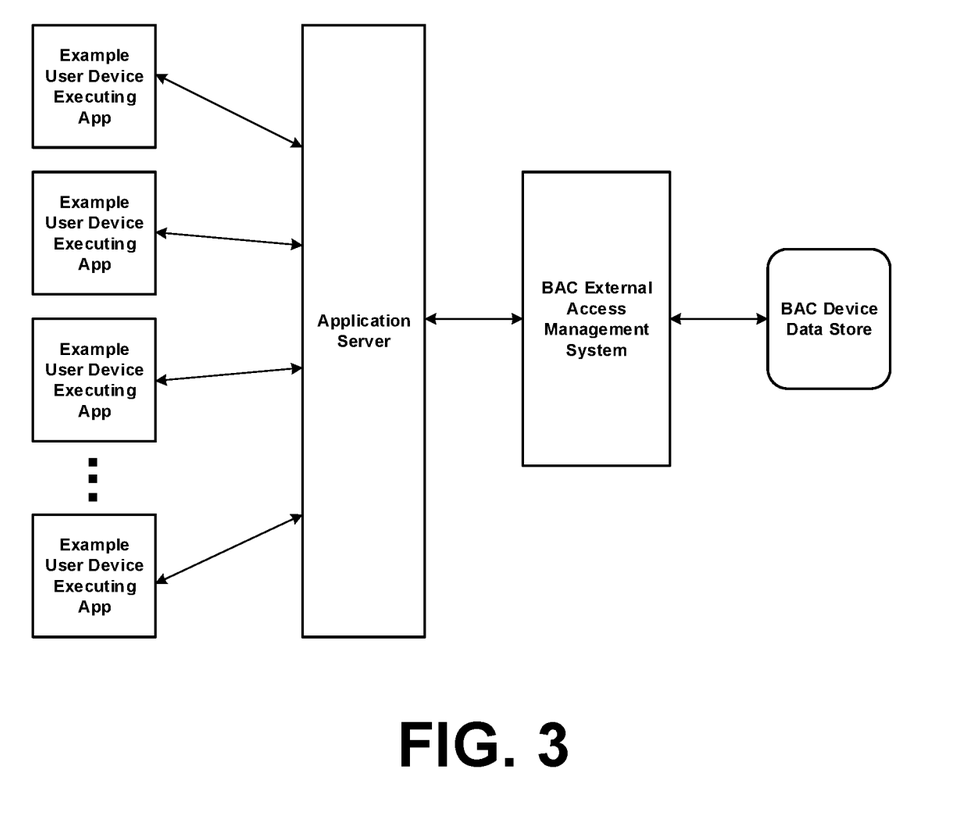
FIG. 3 illustrates a system according to one embodiment.

In the example of FIG. 3, a plurality of example user devices (which may include PCs, smartphones, tablets, and the like) execute respective instances of a common app. Each instance of the app communicates with an app server over a network (for example the Internet). The application server is responsible for submitting requests to system 100 via a predefined API based on input from the instances of the app executing at user devices, and receives responses via the same API (which are then used to provide response data to the relevant user devices).

API request handling module 102 is configured to, in respect of each request:
  (i) Determine whether or not the request is to be permitted based on operation of permissions rules module 104; and
  (ii) In the case that the request is to be permitted, perform a data access operation in respect of the BAC database thereby to enable fulfilment the request (in the embodiment of FIG. 1 this include operation of a data access module 103 which is configured to perform queries of database 110).

In this manner, system 100 enables access to the data values presented by each of the plurality of physical devices on the BAC network to a plurality of third-party applications, in an environment that is isolated from the BAC network.

Each request received by module 102 is associated with data that enables determination a permissions level. This may include any one or more of the following:
  A token associated with a particular application or application server, such that the permissions module determines permissions responsive to attributes of the app responsible for the request. For example, user apps are tested and approved prior to being allocated a token, and preferably the token is maintained at the application server level. In essence, this allows permissions setting at an app level, such that only authorised apps are able to access system 100.
  A token associated with a particular user. For example, this may be a user email address (or other ID) which is stored in permissions data 104. This allows for permissions to be set on a user-by-user basis. For example, a given building administrator provides to system 100 a table of user IDs (for example email including addresses) and other data, which allows for setting of user permissions on a user-by-user basis. For example, this may be based on a user's location within a building, role within a building or organisation, scope of responsibility, and so on. This token may take the form of a set of login credentials supplied by the user via the app, which are passed on to system 100 thereby to enable verification of a user in permissions data 104 from data inputted using the app.

Figure 4:
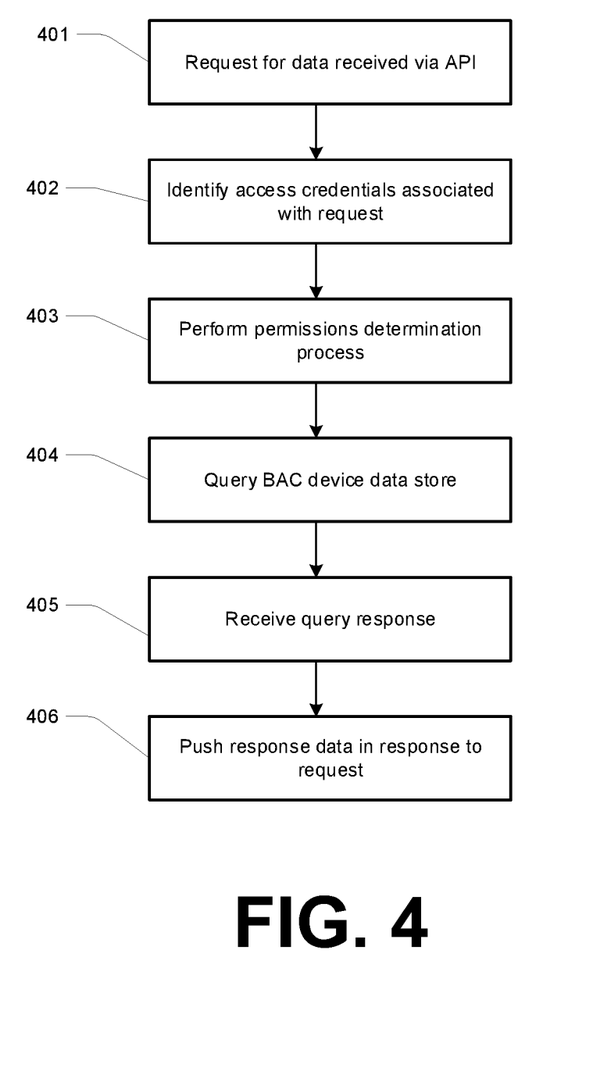
FIG. 4 illustrates a method according to one embodiment

An example method is shown in FIG. 4. A request for data is received from a third-party app (e.g. from an app server) at 401. At 402, access credentials associated with the request are identified (for example application and/or user credentials), and these are used at 403 thereby to perform a permissions determination process thereby to validate that the request is able to be fulfilled (i.e. whether the access credentials provide requisite access rights to requested device data, for example based on one or more device attributes). Assuming the permissions determination process is successful, a query of the data store is performed at 404, and a response provided at 405. This data is used to provide a response to the initial request at 406.

Figure 5:
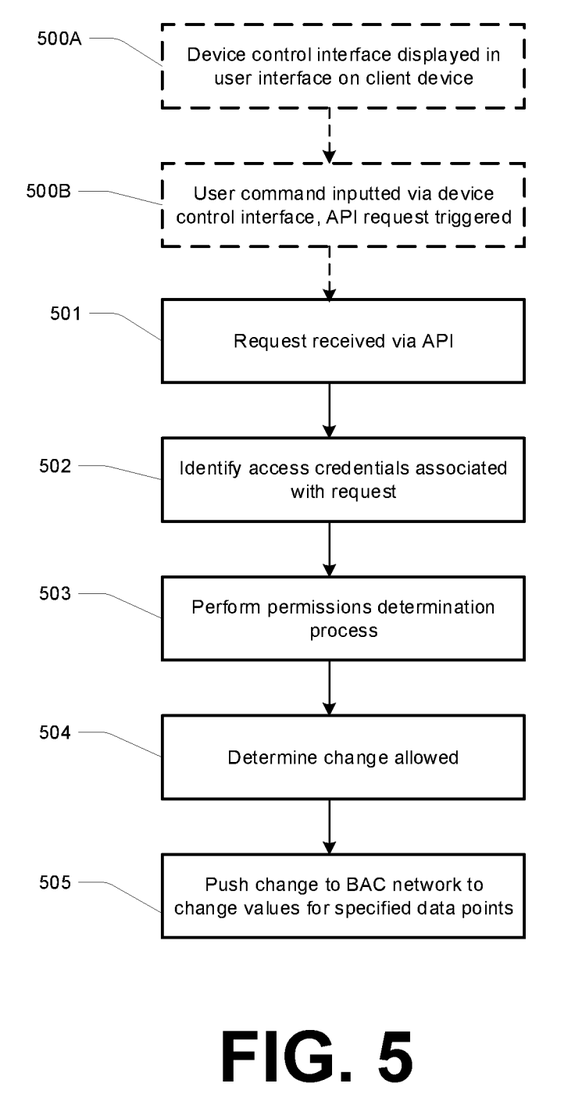
FIG. 5 illustrates a method according to one embodiment

The disclosure above relates to situations where the flow of data from BAC network 150 to user devices is upstream only. In some embodiments system 100 additionally provides for device control in a downstream direction, as shown in FIG. 5, thereby to enable third-party apps to control devices on BAC network 150. In this regard, system 106 includes a BAC data output module which is configured to provide to a BAC modification module 154 on BAC network 150. Module 154 is configured to enable modification of a data value stored by a specific one of devices 152A-152n (this in some cases requires access to a control protocol for a plurality of the BAC devices on network 150) In some embodiments modules 106 and 154 are individually or collectively configured to limit a number of transmissions made on network 150. This is additional and/or alternately achieved via permissions setting for the third-party apps.

FIG. 5 illustrates an example method for BAC device control. Blocks 500A and 500B represent processes permed at a user device, whereby a control interface for a BAC network device (for example a light in a particular room) is displayed via a client device user interface. This control interface includes a representation of a current point data value (e.g. representing the light in an "on" configuration). The user then provides at 500B a user command to change that value, (e.g. changing the light of an "off" configuration). This triggers an API request via the app and app server, which is indicative of a request to change a value associated with a specific data point in the BAC network to a specified different value (e.g., in plain language, switching a data value for a particular lighting controller thereby to switch off a light). The request is received at system 100 via the API at 501, credentials associated with the request extracted at 502, and a permissions determination process performed at 503. A determination that the change is allowed is made at 504. This in some embodiments includes an additional process which endures the modified data value falls within an acceptable range for the relevant point. The change is then pushed at 505 via the gateway to the BAC network, thereby to effect the change at the relevant device.

As noted above, input module 105 uses the Point IDs to map the data values to specific locations in data store 110. It will be appreciated that raw data exported from the BAC network is defined by reference to Point IDs and data values, without context as to the practical nature of each individual point (for example the form of physical sensor or device that is represented by the control point).

In some embodiments, an AI-based machine learning process is configured to assist in automation of categorisation of point data to point types. Labelled training data is obtained from a BAC network where each Point ID has a known point type. This preferably takes the form of a stream of time-coded data for an extended period of time, for example a period spanning multiple days. By such an approach, a pattern recognition system (for example a neural net classifier or artificial neural network) is trained via the labelled training data, such that it is configured to autonomously predict a point type for an unlabelled stream of point data (for example a stream of data including a Point ID, timestamp, and one or more values for that time stamp). This allows for automated classification of point data to point types within BAC device data store 110.

In one embodiment, training data is extracted from a plurality of existing BAC networks, where each Point ID is already classified as a particular point type, and training data sets defined as 24-hour data feeds. So, for example, for each data point in each of a plurality of existing BAC networks, a plurality of 24-hour data feeds (or other time periods) are extracted and labelled with the relevant data point type. These are provided as training data to a neural net classifier. After a deemed acceptable level of training data has been provided, the neural net classifier is provided with data feeds from a new BAC network extracted by polling module 153 over gateway 120 for storage in data warehouse 110. This allows for records in data warehouse 120 to be autonomously populated thereby to associate each Point ID with a point type. There may still be manual processes required to associate each Point ID with additional context (for example a floor in a building, and so on), however by knowing point types the resources required are substantially reduced. Furthermore, additional technical means can be implemented to simplify a process of determining the additional context, for example based on knowledge of network topology within the BAC network (which may assist in labelling Point IDs based on controllers and other network infrastructure, in respect of which contextual knowledge may be available via a pre-existing BMS).

In some embodiments a neural network is additionally trained to enable automated recognition of multiple points that belong to a common device/system (for example an HVAC component having multiple BAC points). Again, this is achieved using to labelled data which includes a feed of point data for a plurality of points belonging to a common device/system. This allows for records in data warehouse 120 to be autonomously populated thereby to associate each Point ID with a point type and further associated with a set of systems which are comprised of a set of points.

Using the above approaches, a process by which BAC device data store 110 is configured to contextualize point data to physical sensors/devices/systems in a built environment is significantly streamlined.

So as to provide an example of practical utility of technology disclosed above, consider an example where a third party wishes to develop technology to consider utilization of lighting in a building (for example in the context of optimizing energy efficiency). The third party is able to be granted permissions to access via read operations a subset of data in data warehouse 110 based on point types, including lighting controllers and other point types that are relevant to the project in question (e.g., motion sensors, door sensors, and so on). This access may be granted across multiple such data warehouses for multiple buildings, thereby to enhance access to data. The third party is then able to use the data thereby to develop a software platform and test functionalities (for example in a modelling capacity). This may then be expanded into a pilot program whereby permissions to push data back to data warehouse 110 are granted for a subset of the points (for example granting write access for lighting controllers on a particular floor of a building). Following this, a software platform may be rolled out to tenants or the like across a number of buildings and/or locations within buildings, with the software being granted selective limited access to the data warehouse 110 of the relevant building based on its specific requirements for functionality.

This greatly expands opportunities for technical innovation in the building automation and management space, by allowing third party developers opportunities to access BAC data in a strictly controlled manner (with permissions able to be defined based on any attributes associated with Point IDs defined in data warehouse 110), and without risk of overstressing a BAC network (given that gateway 120 isolates software platform queries of BAC network point data from the BAC network itself).

Figure 6:
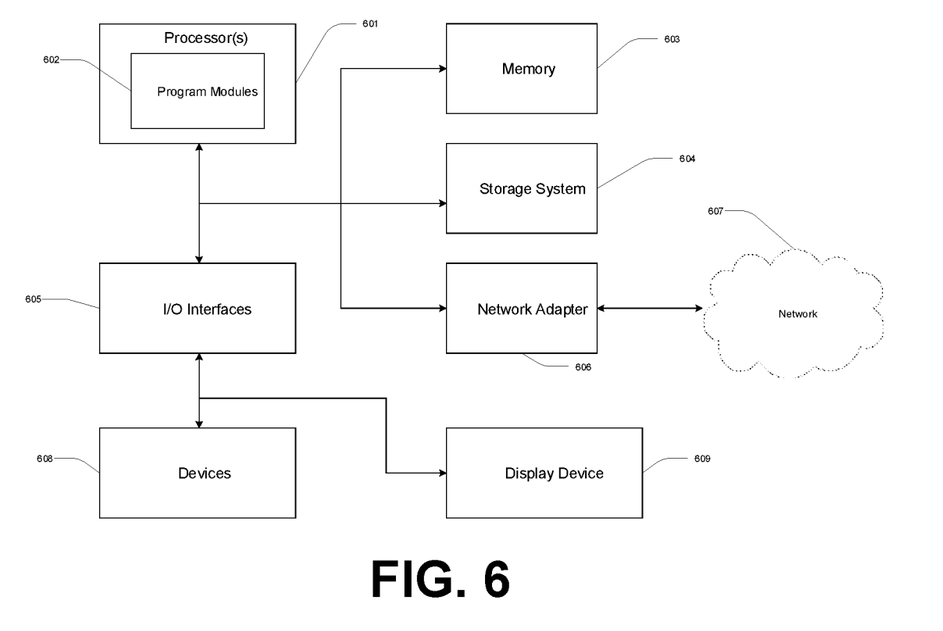
FIG. 6 illustrates an example computer system.

FIG. 6 illustrates an example computer or processing system that may implement any portion systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 601, a system memory 603, and a bus 605 that couples various system components including system memory 606 to processor 601. The processor 601 may include a software module 602 that performs the methods described herein. The module 601 may be programmed into the integrated circuits of the processor 601, or loaded from memory 603, storage device 604, or network 607 or combinations thereof.

Bus 605 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 603 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 605 by one or more data media interfaces.

Computer system may also communicate with one or more external devices 608 such as a keyboard, a pointing device, a display 609, etc.; one or more devices that enable a user to interact with computer system; and/or any devices (e.g., network card, modem, etc.) that enable computer system to communicate with one or more other computing devices. Such communication can occur via Input/Output (I/O) interfaces 609.

Still yet, computer system can communicate with one or more networks 607 such as a local area network (LAN), a general wide area network (WAN), and/or a public network (e.g., the Internet) via network adapter 606. As depicted, network adapter 606 communicates with the other components of computer system via bus 605. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method configured to enable a third-party app to access data available via a building automation and control network, the method including:
   maintaining a BAC (Building Automation and Control) database of data values presented by each of a plurality of physical devices on a BAC network, wherein the database is isolated from the BAC network such that a user accessing the database does not gain direct access to any physical devices on the BAC network;
   providing an API request handling module which is configured to receive, via an API, requests from a plurality of third-party software platforms, wherein the API request handling module is configured to, in respect of each request:
   (i) determine whether or not the request is to be permitted based on operation of a permissions rules module, wherein the permissions rules module defines access requirements for data in the BAC database; and
   (ii) in the case that the request is to be permitted, perform a data access operation in respect of the BAC database thereby to enable fulfilment the request,
   thereby to enable selectively controlled access to the data values presented by each of the plurality of physical devices on the BAC network to a plurality of third-party applications, in an environment that is isolated from the BAC network.

2. The method according to claim 1 wherein a data exchange module is configured to, in response to an API request that is approved by the permissions rules module, cause pushing of data via a gateway to a specified device on the BAC network thereby to update a data value maintained by that device.

3. The method according to claim 1 wherein each API request includes data representative of a submitting software platform, and wherein the permissions rules modules includes rules which assign permissions that are responsive to software platforms.

4. The method according to claim 1 wherein a given API request includes a user-identifying token, and wherein the permissions rules module includes rules which assign permissions based on one or more characteristics of the user-identifying token.

5. The method according to claim 1 wherein a polling module is provided on the BAC network, wherein the polling module is configured to cause periodic polling of the physical devices thereby to cause transmission of current device data to a data exchange module which is configured to update the BAC database.

6. The method according to claim 5 wherein the polling module is configured to implement a plurality of different polling schedules, wherein for each physical device a polling schedule is designated based on one or more attributes of that device.

7. The method according to claim 1 wherein the BAC database maintains current and historical values for each of the physical devices on the BAC network.

8. The method according to claim 1 wherein the BAC network is a BACnet network.

9. The method according to claim 1 wherein the BAC database maintains, for each of the physical devices, a record that includes a plurality of attributes for the physical device in addition to one or more current data values associated with the physical device.

10. The method according to claim 9 wherein the permissions rules module is configured to control access to data in the BAC database for data relating to a particular physical device based on one or more attributes of that physical device.

* * * * *